April 19, 1960 B. E. MURPHY ET AL Re. 24,811

BRUSH CUTTER

Original Filed April 30, 1957 3 Sheets-Sheet 1

INVENTOR
BYNUM E. MURPHY
WILLIAM L. BREWER, JR.
ANDREW E. MELTON

BY Scrivener & Parker

ATTORNEYS

BRUSH CUTTER

Original Filed April 30, 1957 3 Sheets-Sheet 2

INVENTOR
BYNUM E. MURPHY
WILLIAM L. BREWER, JR
ANDREW E. MELTON
BY Scrivener & Parker
ATTORNEYS

BRUSH CUTTER

Original Filed April 30, 1957 3 Sheets-Sheet 3

INVENTOR
BYNUM E. MURPHY
WILLIAM L. BREWER, JR.
ANDREW E. MELTON

BY Scrivener & Parker
ATTORNEYS

United States Patent Office

Re. 24,811
Reissued Apr. 19, 1960

24,811

BRUSH CUTTER

Bynum E. Murphy, William L. Brewer, Jr., and Andrew E. Melton, Minden, La., assignors to Dealer Associates, Inc., Minden, La., a corporation of Louisiana Original No. 2,872,770, dated February 10, 1959, Serial No. 656,143, April 30, 1957. Application for reissue July 23, 1959, Serial No. 829,171

3 Claims. (Cl. 56—25.4)

Matter enclosed in heavy brackets [ ] appears in the original patent but forms no part of this reissue specification; matter printed in italics indicates the additions made by reissue.

This invention relates to rotary cutters and more particularly to rotary cutters of the tractor-borne or driven variety which are especially suited to the cutting of brush, small trees, and other dense vegetation.

A principal object of the present invention is the provision of rotary cutting apparatus which may be propelled or carried by a tractor and which is operated directly by the tractor power take-off to drive rotatable cutter means of sufficient ruggedness for the cutting down and shredding of brush, young trees, and like vegetation as the tractor progresses over an area to be cleared.

Another object of the invention is the provision of improved means for transmitting power from the tractor power take-off to the rotatable cutting means of the apparatus of the invention.

Other objects and their attendant advantages will become apparent as the following detailed description is read in conjunction with the accompanying drawings wherein.

Figure 2:
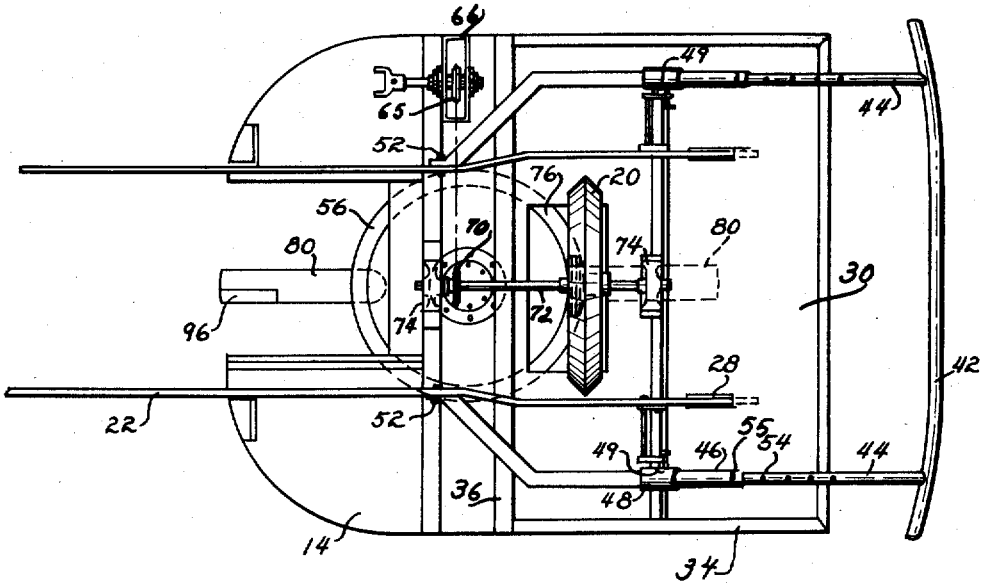
Fig. 2 is a top plan view of the apparatus of Fig. 1.
Figure 1:
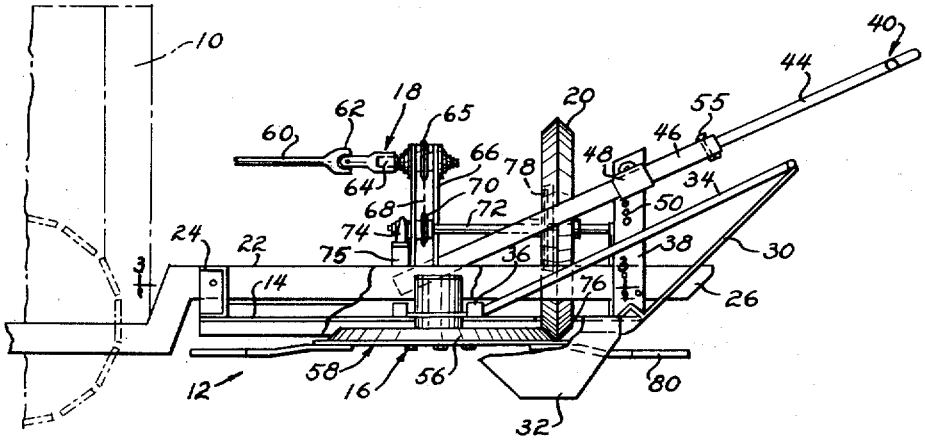
Fig. 1 is a side elevational view, partly broken away, of a form of rotary cutter constructed in accordance with the invention and adapted to be carried in front of a tractor.

Referring now to Figs. 1 and 2, reference numeral 10 refers generally to a tractor to which is attached the brush cutting apparatus of the present invention indicated generally by the reference numeral 12. The apparatus 12 is shown mounted at the front end of the tractor.

More particularly, the apparatus of the invention includes a bedplate 14 which is adapted to support the revolving cutting mechanism indicated generally at 16 and the driving means therefor comprising a power take-off connection 18 and a cone type drive 20, all of which are described with more particularity hereinafter.

The plate 14 carrying the aforementioned mechanism is connected to the front end of the tractor by means of a pair of spaced arms 22 which may be hydraulically raised and lowered by usual power actuators (not shown) such as those employed for the control of a bulldozer blade. The plate 14 may be connected at its rear end to the arms 22 by brackets 24 and the arms may extend sufficiently far forwardly so that their end extremities 26 may project through slots 28, more clearly shown in Fig. 2, in an upwardly bent portion 30 of the plate 14. The upwardly bent portion 30 of the plate serves as a deflecting apron which cooperates with a pair of depending side plates 32, welded or otherwise attached to the opposed forward side edges of plate 14, to direct and guide the vegetation to be cut into the cutting zone beneath the plate 14. The apron 30 is maintained rigid by means of struts 34 welded between the upper corners of the apron and a suitable transverse abutment 36 welded or otherwise secured to the upper surface of the plate 14. At its forward end the bedplate is connected to the arms 22 by means of a pair of upright members 38 which may be welded to the plate adjacent the bend of the apron and transversely spaced to bracket the arms 22 to which the upright members may be attached as by bolts or the like.

The upright members 38 not only serve as supports for plate 14 but they also may provide an adjustable support for a pusher bar assembly, indicated generally at 40, for bending over trees so that they will be more readily received into the cutting zone. As illustrated the pusher bar assembly consists of an outwardly curved transverse bar 42 having integral therewith a pair of arms 44 which are telescopically received in the outer ends of tubular members 46 which in turn are slidingly engaged in a pair of brackets 48 which may be pivotally attached as by toggle bolts 49 or the like to any corresponding pair of a series of aligned holes 50 in the upper ends of the upright members 38. The inner ends of the tubular members 46 may be suitably inwardly bent and pivotally attached at 52 (see Fig. 2) to the arms 22. The pusher bar arms 44 may be provided with a series of aligned holes 54 which may be brought into registry with a hole in the outer end of the tubular member where a suitable toggle bolt 55 may maintain the pusher bar at the desired distance in front of the apron 30. The pivoted connections 52 and the sliding brackets 48 in cooperation with the aligned series of holes 50 in the upright members 38 permit limited elevational adjustment of the pusher bar 42 so that trees may be engaged in the optimum position for proper bending. It will of course be apparent that where only light growth is to be cut, the pusher bar assembly may be readily removed.

The rotary cutting mechanism 16 is rotated by means of the cone pulley 20 which frictionally engages a sloping driven surface 56 of a blade carrying member 58 more fully described hereinafter. The cone pulley 20 is driven from the power take-off shaft of the tractor which may be connected to driving mechanism mounted on the plate 14 through a shaft 60 provided with universal joints 62, preferably located at both ends of shaft 60 (though only one joint is shown) which in turn is connected to a sprocket shaft 64 carrying a sprocket 65 and mounted in suitable bearings atop a post 66 secured to the plate 14 in substantial alignment with the tractor power take-off. The sprocket 65 is connected by means of the usual sprocket chain, indicated by the dotted line 68, to a driven sprocket 70 secured to a shaft 72 mounted at its opposite ends in bearing pillows 74 atop suitable posts 75 welded to the plate 14 in positions supporting the shaft 72 in the vertical plane through the fore and aft center line of the plate 14. The shaft 72 carries the cone pulley 20 which projects downwardly through an opening 76 in the plate 14 into engagement with surface 56 and is operatively connected to shaft 72 by means of a known over-running clutch 78 in the usual manner.

From the foregoing description it will be apparent that when the power take-off shaft of the tractor is operated, rotation thereof will be transmitted through the shaft 60, universal joint 62, sprockets 65 and 70, shaft 72 and cone pulley 20 to horizontally rotate the blade carrying member 58 through the frictional engagement of the cone pulley driving surface with the surface 56 of the blade carrying member.

Figure 3:
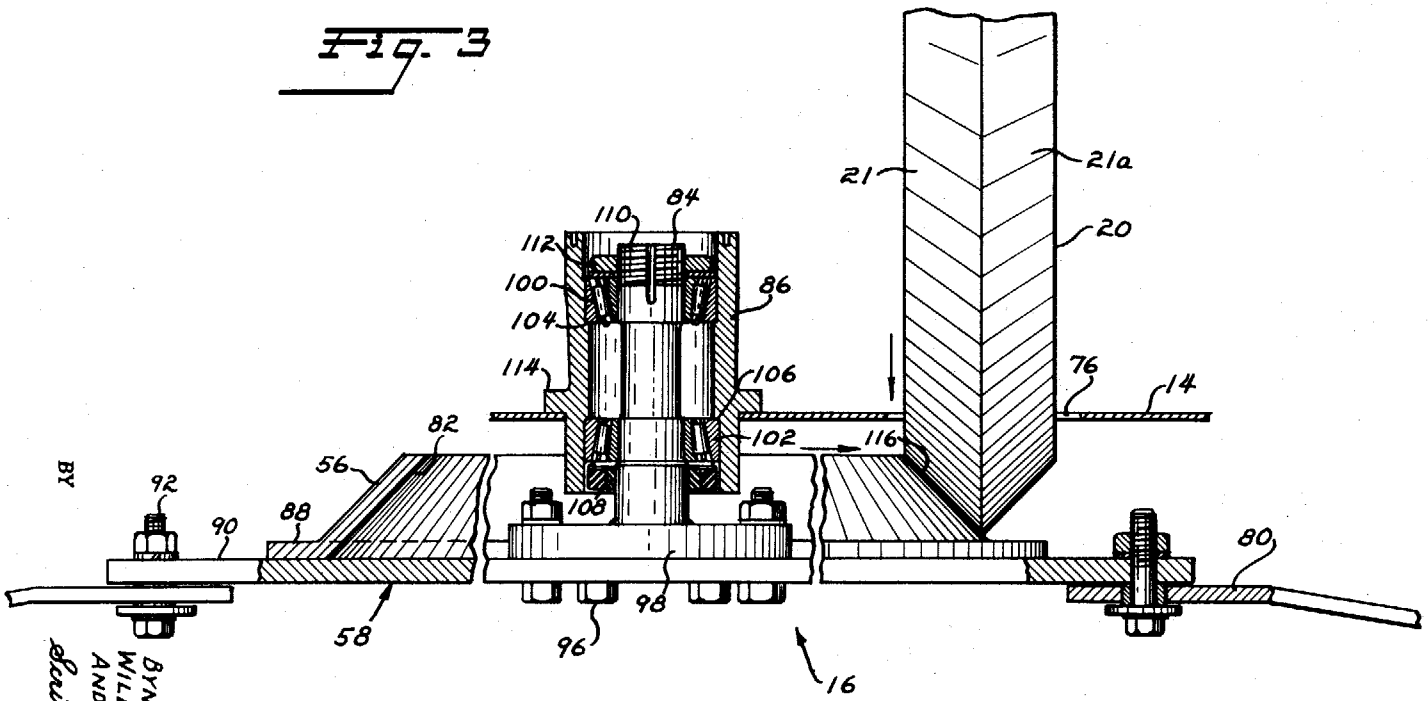
Fig. 3 is an enlarged detail sectional view taken substantially on the line 3—3 of Fig. 1.

Referring now to Fig. 3, the revolving cutting mechanism 16 consists of the horizontal blade carrying member 58, swingable cutting blades 80, a frusto conical member 82 providing the driven surface 56, a central shaft 84 to which the blade carrying member is attached, and a bearing housing 86 for receiving the shaft 84. The frusto conical member 82 may be flanged at 88 and concentrically and rigidly attached to the upper surface of the blade carrying member 58 which comprises a circular plate having a marginal area 90 extending beyond the flange 88 and adapted to be drilled to receive pivot bolts 92 for swingably supporting the cutter blades 80 which may be provided with cutting edges 96 on their leading sides as illustrated in Fig. 2. The blades are swingably mounted so they will swing inwardly without excessive damage when an uncuttable object, such as a rock, is struck by the blades during a cutting operation. If desired, a plurality of opposed holes can be provided about the marginal area 90 to receive additional cutting blades 80.

The member 58 is secured to the shaft 84 by the provision of bolts 96 received in registering holes passing respectively through member 58 and a flange 98 integral with the lower end of the shaft 84. This member is suitably machined to receive the inner races of combination radial and thrust roller type bearings 100 and 102 and the housing 86 is suitably counterbored to provide shoulders 104 and 106 for supporting the outer races of the respective bearings. As known shaft seal 108 may be provided at the lower end of the housing to conserve lubricant and prevent the entrance of dirt into the bearing area. The upper end of the shaft 84 may be threaded as at 110 to receive a nut and washer assembly 112 to retain the bearing and shaft in assembled condition. The entire assembly of the revolving cutting mechanism is secured to the plate 14 by the provision of a radial flange 114 integral with the housing 86 and resigned to seat on the upper surface of the plate 14 and be rigidly attached thereto with the lower portion of the housing projecting downwardly through the plate in the manner shown.

Figure 4:
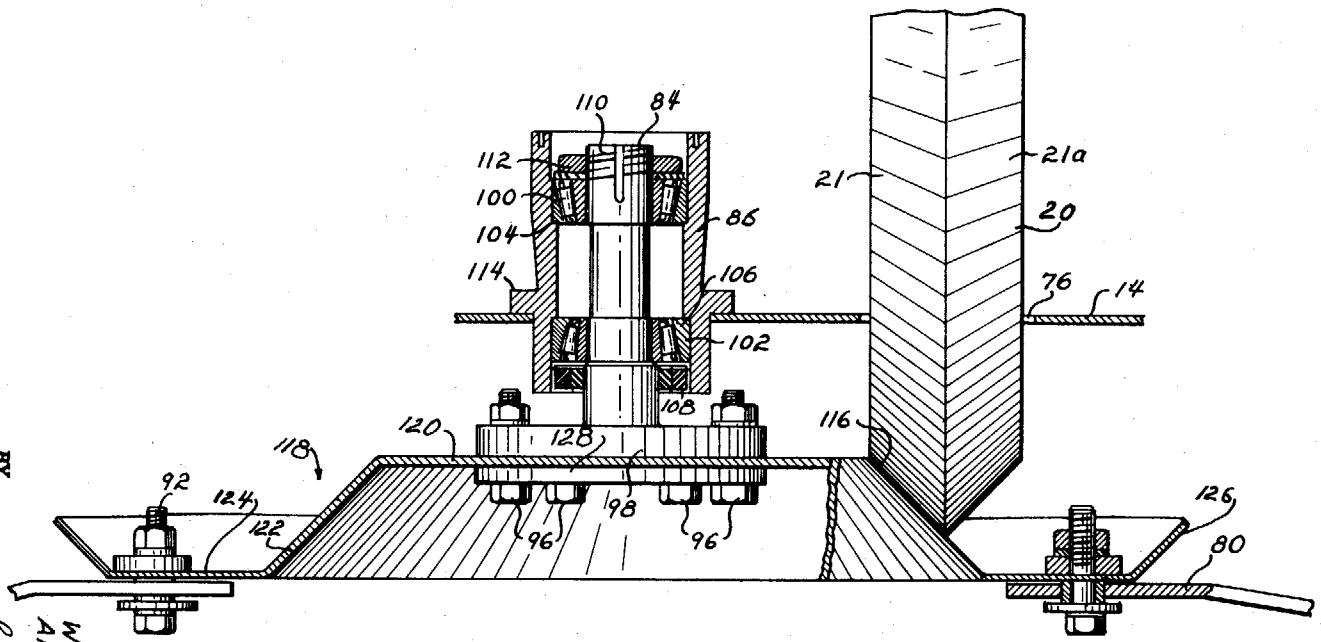
Fig. 4 is a view similar to Fig. 3 showing a second embodiment of the mechanism illustrated in Fig. 3.

The embodiment shown in Fig. 4 is substantially the same as in Fig. 3 except as to the construction of the blade carrying member 58. In Fig. 4, parts identical to those in Fig. 3 carrying the same reference numeral and description of these parts of Fig. 3 suffices for Fig. 4. However, instead of a blade carrying member 58 comprising a flat plate and a frusto conical member 82 welded to the plate, the blade carrying member 118 of Fig. 4 comprises a unitary dished plate which may be formed in a single stamping operation to provide a horizontal flat central portion 120 for attaching the plate to the shaft 84, a frusto conical friction surface 122, a horizontal flange 124 for receiving the blades 80 and the pivot bolts 92, and an upturned skirt 126. The plate 118 may be attached to the flange 98 of shaft 84 by means of the bolts 96 which cooperate with a plate 128 to sandwich the portion 120 of member 118 between the flange 98 and the plate 128. The frusto conical surface 122 is preferably at a 45° angle with the horizontal and cooperates with the drive wheel 21 in the same manner as described in Fig. 3. The skirt 126 serves several functions one of which is to provide additional rigidity to the member 118. In addition, the skirt acts similarly to sled runners and serves to guide the mechanism over abrupt objects such as large stones and [three] *tree* stumps left after the machine has cut the trees down. This is an important feature and eliminates in a larger measure shocks and overload which might occur where the blade-holder is unable to ride over uncuttable objects. In addition to the above, the skirt serves as a protecting shield for the pivot bolts 92 and for the driving pulley 20 where it projects below the plate 14 and into engagement with the surface 122.

*An important feature of the unitary holder of Fig. 4 resides in its provision of a recess on its under side defined by the frusto-conical friction surface 122 between the raised central portion 120 and the flange 124. This recess cooperates with the upturned skirt 126 to provide a space into which uncuttable objects can extend after the skirt has enabled the holder to slide over the object as previously described. The recess provides two important advantages, the first of which is that any object which the skirt is capable of sliding over enters the recess and for the remainder of the passage of the holder over the object, the latter is entirely out of engagement with the holder so that the only transverse bending shock loads on the central spindle are produced when the object initially engages the skirt and when the object slides out from under the holder as the cutter advances. The second advantage is the fact that after the holder is initially slid over the object, the object, then being contained in the recess out of engagement with the holder, has no tendency to cause the holder to rock on the object and slide or slip sideways as would be the case if the lower side of the holder were flat. Thus the cutter traverses a substantially straight path which would, as a practical matter, be substantially impossible if the holder were perfectly flat on the bottom surface. By providing the relieving space, in accordance with the invention, the varying bending loads on the spindle and sideways slipping of the entire cutter is eliminated and the cutter works more smoothly over the rugged areas than is possible with the flat blade holders used heretofore. It should be noted, of course, that the inner or bottom side of the friction surface 122 provides a sliding surface for the object as it leaves the recess in the same way as the skirt 126 causes the holder to initially slide up and over the object.*

An important feature of the present invention is the provision of means for driving the revolving cutter mechanism without the exertion of any torque whatsoever on the shaft 84. This is accomplished through the use of the cone pulley 20 and the frusto conical portion 82 or 122 which spaces the point of driving effort, indicated at 116, radially away from the shaft 84 so that no turning torque is exerted on the shaft. With this arrangement the shaft is substantially immune to shock loads which are expected to be of a fairly large order when trees of considerable size are to be cut. Consequently, the shaft, bearings and housing can be of minimum dimensions consistent with the provision merely of a rotatable support for the revolving cutting mechanism. Such minimum dimensions would not be possible were the cutting mechanism to be driven by drive means connected directly to the shaft as has been the usual practice heretofore.

Preferably the driving and driven surfaces of the cone pulley 20 and the frusto conical member 82 meet at 45° angles to minimize slip. The cone pulley is constructed preferably of molded rubber or other equivalent substance and is provided with two back-to-back conical surfaces 21 and 21a (see Fig. 3) so that when one surface is worn the pulley may be reversed and the other surface used.

From the foregoing description it is believed that the operation of the cutter of the invention should be obvious. It will be apparent that for a front carried brush cutter as illustrated, the height of cut is merely adjusted by a proper setting of the power actuators to raise or lower the arms 22 to the desired position. If the cutter of the invention is to be trailed, the described mechanism can be attached to a wheeled chassis similar to that employed with a harvester or cultivator wherein the height of cut can be varied by adjusting the wheels with respect to the chassis. The type of adjustable chassis referred to is shown generally in the patent to Sishc, No. 2,649,678. It is contemplated that in the case of a trailed cutter constructed in accordance with the invention, the cutter would be desirably used in cutting light vegetation as for example, weeds and small bushes in pastures, shredding stalks and orchard prunings, maintaining pipe lines, telephone line rights-of-way etc. The drive from the power take-off can, if the situation demands, be connected directly to the shaft 72 carrying the cone pulley 20. Additionally, a guard can be provided around the cutting zone to prevent possible injury from debris thrown outwardly by the blades. These and various other variations and modifications can be resorted to without, however, departing from the scope and spirit of the appended claims.

What is claimed is:

*1.* A cutter of the type having a horizontal bedplate and horizontally rotating blades, means for mounting and driving said blades beneath said bedplate comprising a rotatable shaft vertically journaled in said bedplate, a circular blade carrying member connected to said shaft beneath said plate, said blade carrying member being a unitary dished structure having a marginal flange for receiving said blades, a central portion for attaching said member to said shaft, an intermediate inwardly and upwardly sloping annular frusto-conical portion integrally connecting the inner edge of said marginal flange to the outer edge of said central portion, and an upwardly and outwardly sloping skirt integral with the outer edge of said flange, a vertically disposed cone pulley journaled on the upper surface of said bedplate and extending through an opening in said bedplate into frictional engagement with said frusto-conical portion, and power means for rotating said pulley to drive said blade-carrying member.

*2. A cutter of the type having a horizontal bedplate and horizontally rotating blades, means for mounting and driving said blades beneath said bedplate comprising a rotatable shaft vertically journaled in said bedplate, a circular blade carrying member connected to said shaft beneath said plate, said blade carrying member being a unitary dished structure having a marginal flange for receiving said blades, a central portion for attaching said member to said shaft, an intermediate inwardly and upwardly sloping annular frusto-conical portion integrally connecting the inner edge of said marginal flange to the outer edge of said central portion, an upwardly and outwardly sloping skirt integral with the outer edge of said flange, and power means operatively connected to said blade carrying member for rotating the same.*

*3. In a cutter mechanism including a vertical rotatable shaft, a circular blade holder connected to said shaft, and means operatively connected to said holder and said shaft for rotating the same, said holder comprising a unitary inverted dish shaped member having a closed top, an open bottom and an outwardly sloping side wall, a peripheral marginal flange connected to the lower end of said side wall and extending radially outwardly with respect to said side wall, a plurality of cutting elements connected to the lower side of said flange, and an upwardly and outwardly sloping skirt integral with the outer edge of said flange.*

References Cited in the file of this patent or the original patent

UNITED STATES PATENTS

| | | |
|---|---|---|
| 2,225,139 | Urschel | Dec. 17, 1940 |
| 2,484,511 | Ingalls | Oct. 11, 1949 |
| 2,522,112 | Gilmour | Sept. 12, 1950 |
| 2,529,870 | Golasky | Nov. 14, 1950 |
| 2,612,017 | Jarmin | Sept. 30, 1952 |
| 2,677,926 | Washbourne et al. | May 11, 1954 |
| 2,685,160 | Kuhary et al. | Aug. 3, 1954 |
| 2,706,441 | Caldwell et al. | Apr. 19, 1955 |
| 2,737,772 | Jacobsen | Mar. 13, 1956 |
| 2,743,565 | Dow | May 1, 1956 |
| 2,764,268 | Summerour | Sept. 25, 1956 |
| 2,787,881 | McDaniel | Apr. 9, 1957 |
| 2,793,484 | McNeill et al. | May 28, 1957 |
| 2,867,963 | Lawrence et al. | Jan. 13, 1959 |